United States Patent [19]

Sumida et al.

[11] Patent Number: 4,635,879
[45] Date of Patent: Jan. 13, 1987

[54] TAPE CASSETTE

[75] Inventors: Takashi Sumida, Takatsuki; Sigeo Sasaki, Kyoto; Takao Ketori, Osaka; Kazuhiro Fujita, Nagaokakyo, all of Japan

[73] Assignee: Hitachi Maxell, Ltd., Osaka, Japan

[21] Appl. No.: 774,888

[22] Filed: Sep. 11, 1985

[30] Foreign Application Priority Data

Sep. 12, 1984 [JP] Japan ................... 59-191102
Sep. 14, 1984 [JP] Japan ................... 59-193155

[51] Int. Cl.⁴ .................... G11B 15/32; G11B 23/04
[52] U.S. Cl. ................................ 242/198; 242/199; 360/132
[58] Field of Search .................. 242/197–200; 360/132, 137; 352/72–78

[56] References Cited

U.S. PATENT DOCUMENTS

| 4,163,533 | 8/1979 | Abe ........................ 242/198 |
| 4,309,002 | 1/1982 | Saitou et al. .............. 242/198 |
| 4,482,104 | 11/1984 | Saito ....................... 242/198 |
| 4,513,928 | 4/1985 | Hackett .................... 242/198 |

Primary Examiner—John M. Jillions
Attorney, Agent, or Firm—Birch, Stewart, Kolasch & Birch

[57] ABSTRACT

In a tape cartridge comprising a case body having an opening for viewing the amount of roll of tape, at least one hub accommodated in the case body for winding a recording tape, a plate for closing the opening and a braking member for stopping rotation of the hub when not in use, the plate is composed of a support plate and a transparent window plate portion and is assembled in the case body defining a gap g between the support plate and the inner face of the top wall of the case body. The brake member is slidably inserted in the gap g with a part of the brake member engaging a part of the hub to stop rotation thereof.

6 Claims, 13 Drawing Figures

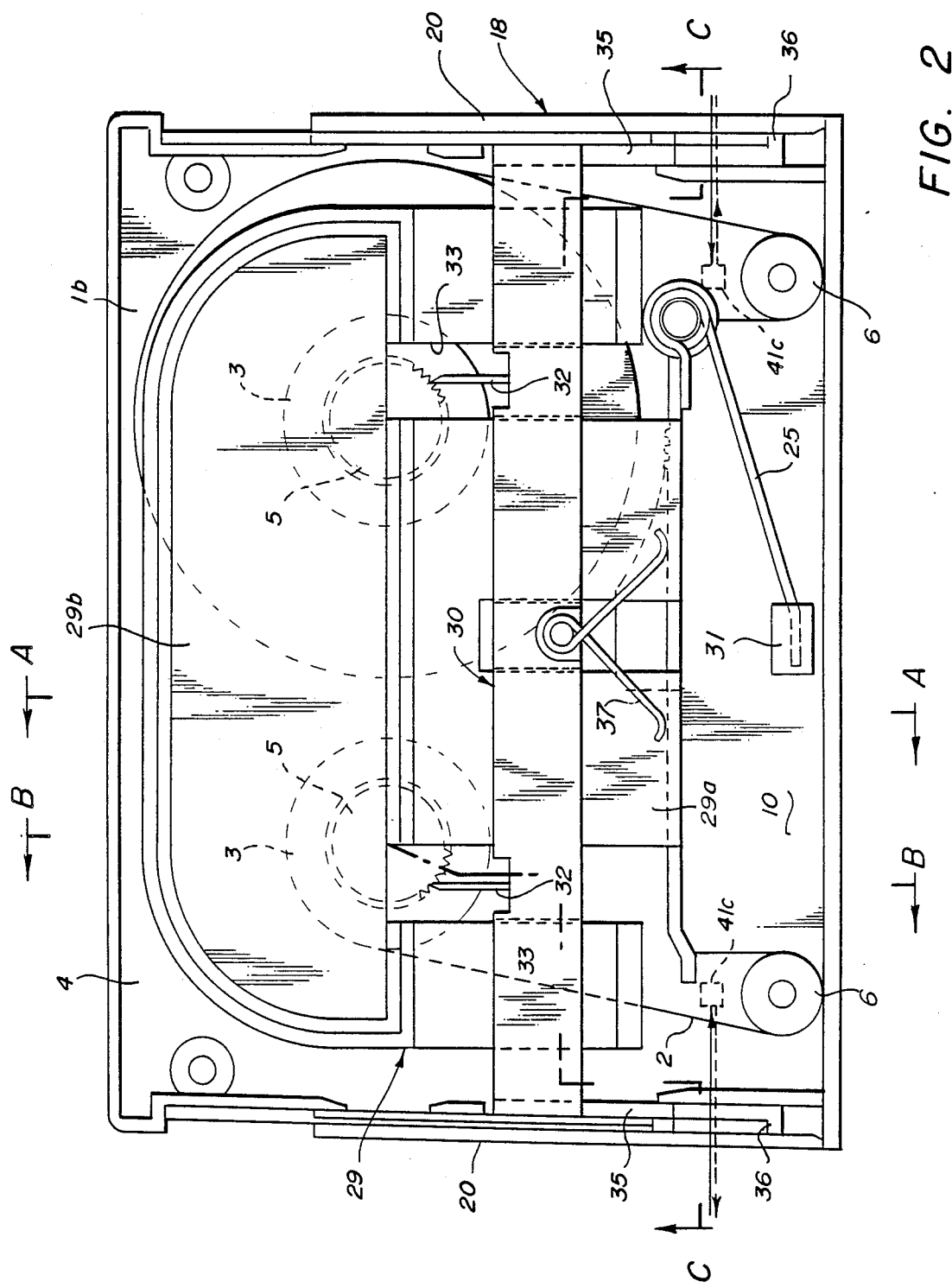

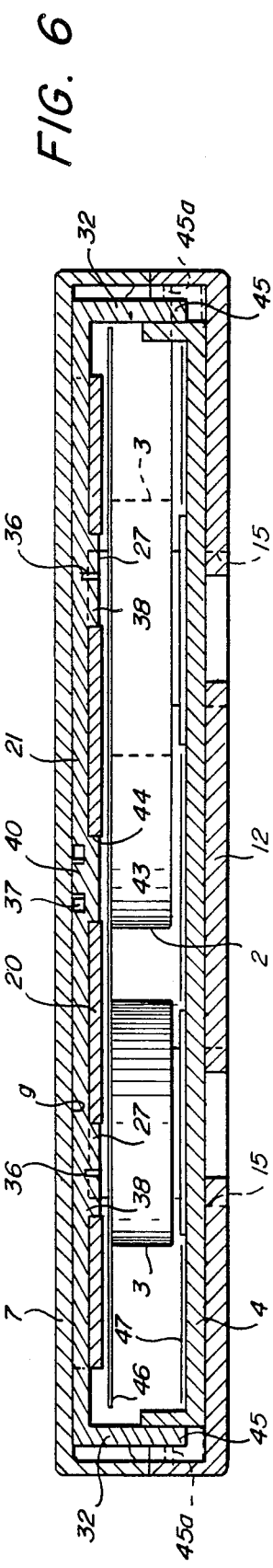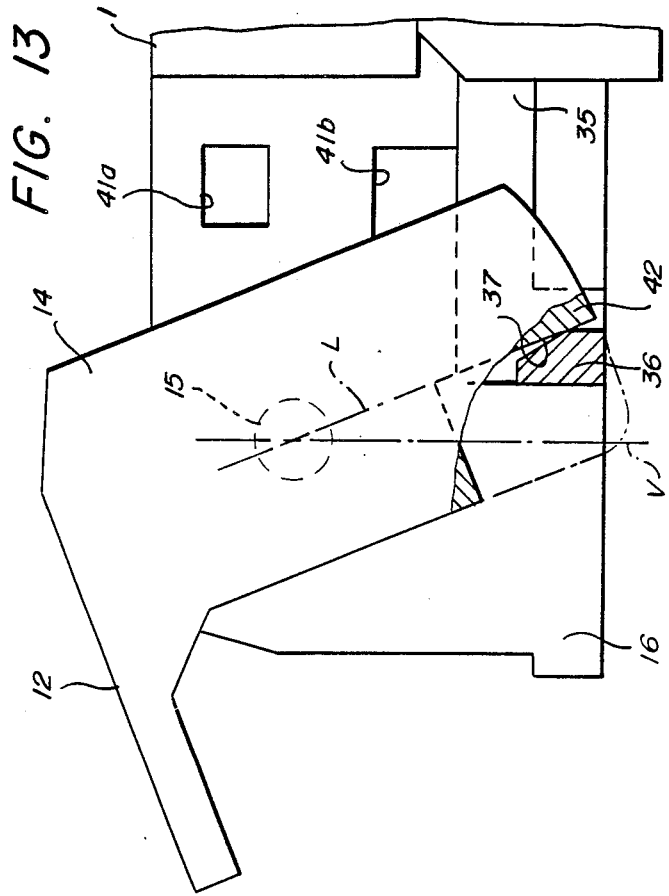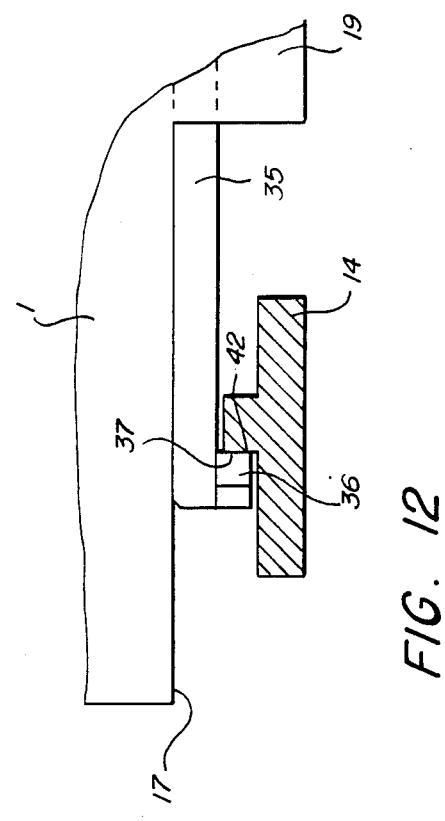

TAPE CASSETTE

FIELD OF THE INVENTION

The present invention relates to a tape cartridge and more particularly to a braking mechanism for braking tape hubs of the tape cartridge.

BACKGROUND OF THE INVENTION

In video tape cartridges or audio tape cartridges of digital recording systems, there has been known to provide a braking mechanism for the tape hubs in video tape cartridges or audio tape cartridges using a digital recording system for preventing undesired rotation of the hubs when the tape cartridge is not in use.

One example of the braking mechanism for this purpose is disclosed in Japanese patent application Ser. No. 110274/1984 filed by the same applicant of this application. The tape cartridge disclosed in the patent application comprises a braking member having generally a gantry shape with a pair of legs formed on both ends of the braking member. The braking member is mounted in a case body so as to move back and forth with the braking member positioned at the front side of the hubs. The braking member is biassed in the back direction by a spring member (not shown) and when not in use, a pair of engaging bars which projected from the rear side of the braking member engage with engaging teeth formed on the outer peripheral of the top portion of the hubs for preventing rotation of the hubs. When the tape cartridge is mounted on a tape player, a releasing member of the tape player acts on the braking member directly or indirectly to move the braking member in the forward direction so that the engaging bars are disengaged from the engaging teeth to release the braking state of the hubs. Since the braking mechanism mentioned above can be applicable to such tape hubs without a flange portion i.e., flangeless hubs, it is advantageous to use the braking mechanism mentioned above when designing small sized tape cartridges.

In the tape cartridge using the braking mechanism mentioned above, the braking member is moved along the inner surface of the top wall of the tape cartridge rocking slightly in a vertical direction due to play between the top wall of the tape cartridge and the braking member. However, it is essential to prevent undesired contact of the braking member with the recording tape in the case body if the braking member is rocked during movement of the braking member. For this purpose, it has been attempted to lay a flexible slip sheet between the braking member and the top edge of the recording tape. In this case, however, since the slip sheet was supported by the braking member which was rocking vertically, the supporting surface of the slip sheet became unstable. For example, in the case where the braking member was moved in the forward direction, there occurred a stepped portion in the slip sheet corresponding to the rear end of the braking member, whereby the recording tape was wound irregularly, resulting in unstable tape running. As mentioned above, since the slip sheet is supported by the rocking braking member, there is the possibility of crushing the slip sheet which may cause a problem in running of the tape.

In place of using a flexible slip sheet, it has been suggested to dispose a rigid sheet made of a material such as vinyl chloride, below the inner face of a top wall of the case body, then inserting the braking member slidably in the gap between the top wall of the case body and the rigid sheet. However, this method requires attaching the rigid sheet below the inner face of the top wall one by one, therefore the amount of parts to be used and the number of work for assembling them are increased, thereby causing the production cost of the tape cartridge to be increased.

SUMMARY OF THE INVENTION

The present invention is provided to overcome the various drawbacks as mentioned above in the tape cartridge employing the braking member mentioned above and has as its essential object to provide a tape cartridge in which the movement of the braking member does not interfere with the tape so as to assure regular tape winding on the hub and correct tape running.

Another object of the present invention is to provide a tape cartridge in which the required number of parts of the braking mechanism can be reduced to as small as possible facilitating assembly of the braking mechanism in position.

In order to accomplish these objects according to the present invention, there is provided a tape cartridge comprising a case body 1 having a top wall 7 with an opening 22, at least one hub 3 accommodated in the case body 1 for winding a tape 2, a plate member 20 having a support plate member 25 and a transparent window plate portion 26 attached to the opening 22 from inside of the case body 1 defining a gap g between the support plate 25 and the inner face of the top wall 7, and a braking member 21 which is engageable with the hub 3 to stop rotation of the hub 3 when the tape cartridge is not in use, the braking member being slidably inserted in the gap g.

BRIEF EXPLANATION OF THE DRAWINGS

FIG. 2 is a top plan view showing the interior of the tape cartridge shown in FIG. 1, FIG. 6 is a cross sectional view taken along the lines C—C in FIG. 2, FIG. 12 is a cross sectional view taken along the lines D—D in FIG. 11, and FIG. 13 is a side view of another modification of the means for displacing the braking member to the release position.

THE INVENTION

Figure 1:
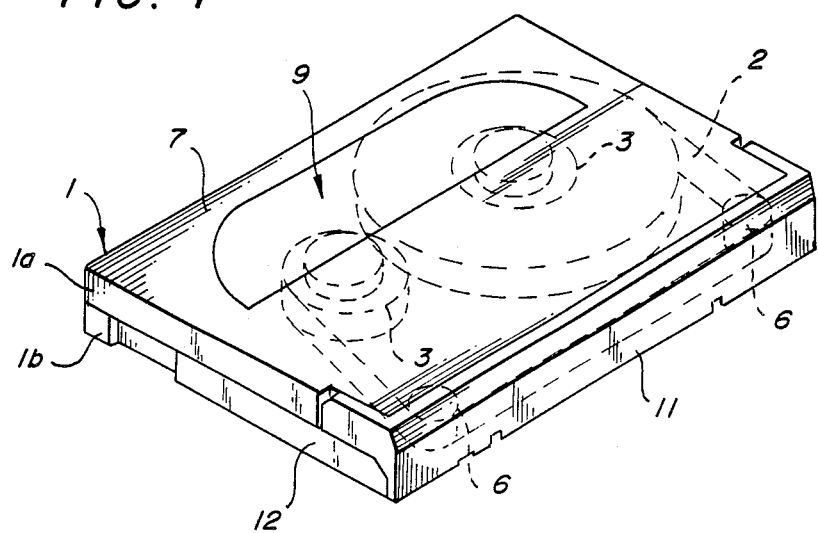
FIG. 1 is a perspective view of a tape cartridge according to the present invention.

Referring to FIGS. 1 to 6, a case body 1 of a recording tape cartridge of a digital audio recording system is formed by a top case 1a and a bottom case 1b made of plastic resin materials and the top case 1a and bottom case 1b are combined together in a butting manner. Inside the case body 1 there are accommodated a pair of hubs 3 juxtaposed in the left half and right half of the case body for winding a recording tape 2. The hubs 3 are rotatably placed facing a pair of drive shaft insertion holes 5 defined in the bottom wall 4 of the case body. A pair of cylindrical tape guide members 6 are disposed on the left half side and right half side near the front end portion of the case body 1. The recording tape 2 is released from one of the hubs 3 passing the tape guide members and can be drawn out of the case body 1, being taken up by another hub.

A tape viewing window 9 is defined on the top wall 7 of the top case 1a. The amount of roll of the tape wound on each of the hubs can be viewed from outside of the case body through the tape viewing window 9.

There is defined a recess pocket 10 in the front portion of the case body 1 with the front part and bottom part of the pocket 10 open. There is provided a front lid 11 in the front portion of the case body 1. The front lid 11 is mounted to the case body 1 so as to be moved between a closed position for closing the front part of the case body 1 and an opened position for opening the front part of the case body 1. A shutter 12 is mounted to the bottom wall 4 of the bottom case 1b as shown in FIG. 7 so as to move in the forward and rearward directions for opening and closing the lower part of the recess of the pocket 10.

When the tape cartridge is not in use, the front part of the case body 1 is closed by the front lid 11 which is biassed toward the closed position by a spring member (not shown). The shutter 12 is biassed toward the forward position by means of a spring member 13, so that the lower opening of the pocket 12 and the drive shaft insertion holes 5 are closed. When the tape cartridge is mounted in the tape player by inserting the tape cartridge in the tape holder of the tape player with a horizontal attitude, the shutter 12 is moved backward against the force of the spring member 13 by engagement of a member in the tape player, whereby the lower part of the pocket 10 is opened and a pair of openings 15 coincide with the drive shaft insertion holes 5. By pushing down the tape cartridge to a loading position, another member of the tape player engages with the front lid 11, which is moved upward and opened. Also, a tape loading pin in the tape player is inserted in the pocket 10 and the drive shafts of the tape player are introduced into the drive shaft insertion holes of the hubs 3 from below.

Figure 7:
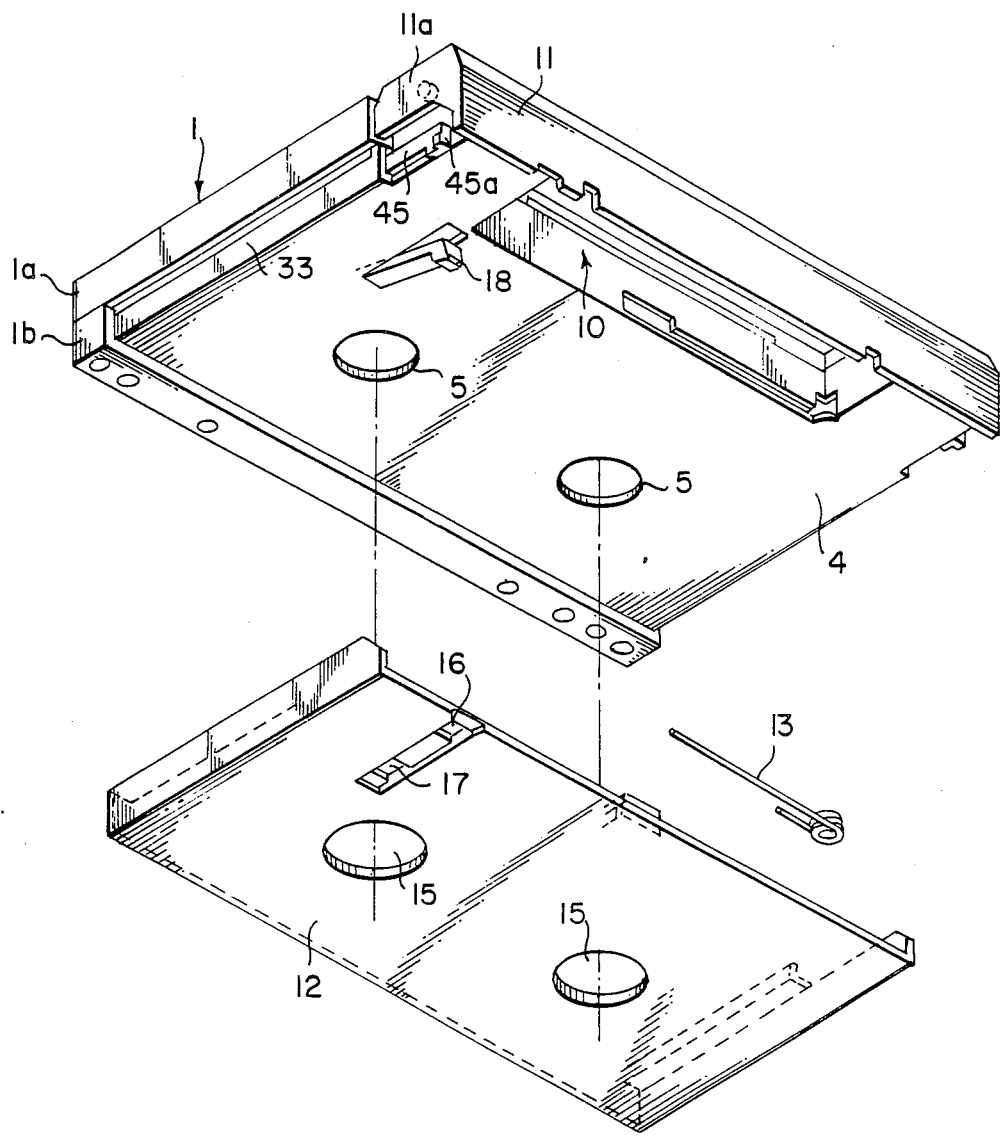
FIG. 7 is an exploded view of the tape cartridge shown in FIG. 1.

A pair of lock holes 16 and 17 are defined in the shutter 12 in the forth and back directions as shown in FIG. 7 and a locking member 18 which is resiliently deformed in the vertical direction is provided at such a position in the bottom wall 4 as to selectively engage with any one of the lock holes 16 or 17 in the bottom wall 4 of the bottom case 1b. By this arrangement, the shutter 12 is locked in the closed position for closing the lower part of the pocket 10 or in the opened position for opening the lower part of the pocket 10. The locking state of the shutter 12 can be released by a further member of the tape player.

The hub locking mechanism according to the present invention for stopping rotation of the hubs 3 when the tape cartridge is not in use is provided in the case body 1.

Figure 8:
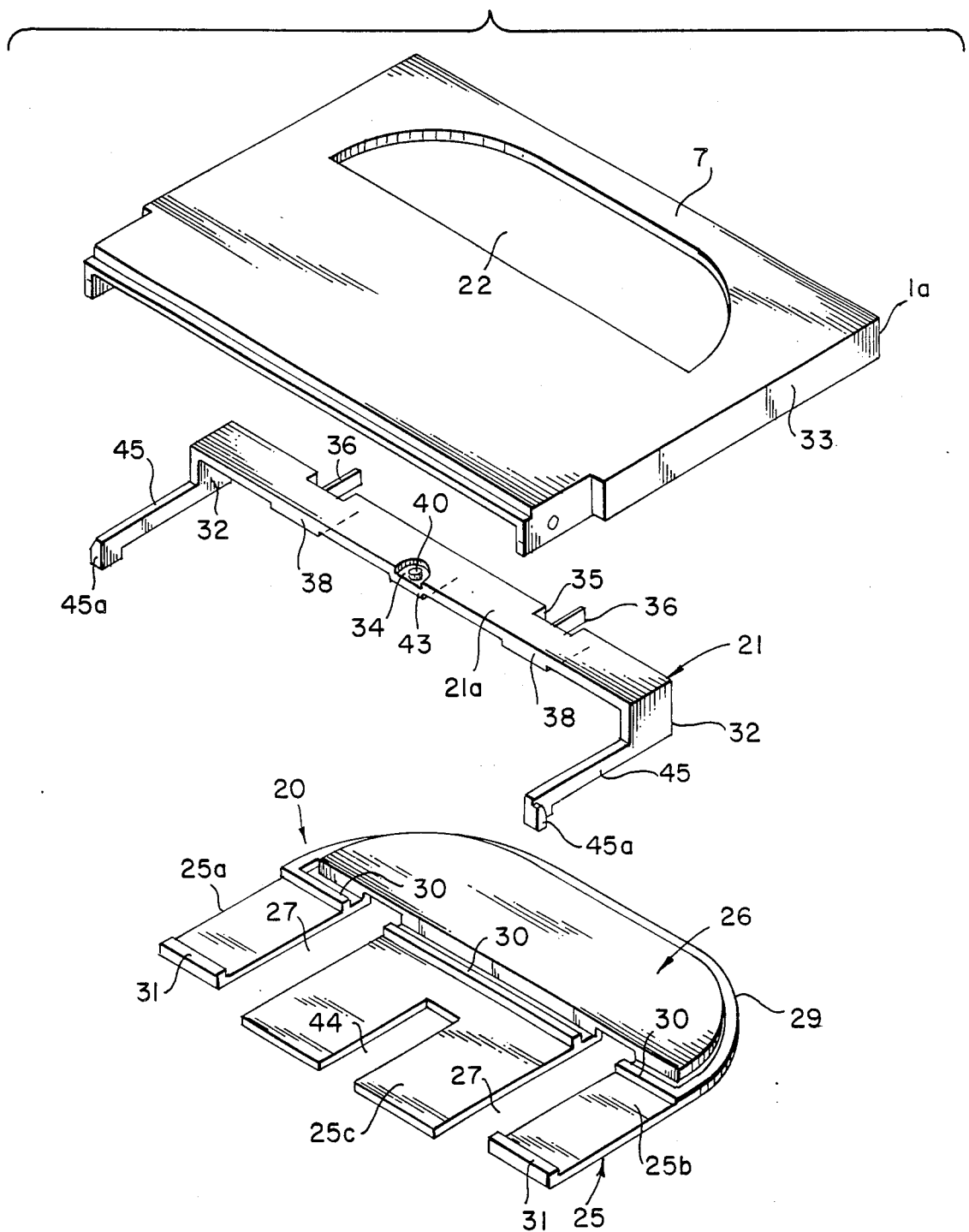
FIG. 8 is an exploded view of an assembly of the top case, braking member and cover plate used in the tape cartridge shown in FIG. 1.

As the hub locking mechanism, the transparent plate 20 for the tape viewing window 9 and the braking member 21 are provided for the arrangement as shown in FIG. 8. An opening 22 is defined on the intermediate portion of the top wall 7 of the top case 1a.

Each hub 3 is provided with engaging teeth 23 around the entire cylindrical surface of the upper part of the hub above the main portion 3a on which the recording tape can be wound. Each of the teeth extends in a vertical direction. The diameter of that portion on which the engaging teeth are formed is smaller than the diameter of the main portion 3a. Each hub 3 is rotatably supported on the bottom wall 4 and the movement of the hub in the vertical direction is limited by the portion 24 (shown in FIG. 5) of the top wall 7.

Referring to FIG. 8 once again, the transparent plate 20 is made of a transparent plastic resin material and comprises a support plate 25 and a window plate 26 integral with the support plate 25. The support plate 25 has its upper surface downwardly stepped from the upper surface of the window plate portion 26. The supporting plate 25 is divided generally into three plate portions 25a, 25b and 25c separated by slits 27 extending in a lateral direction. The plate 20 is attached to the top wall 7 of the top case 1a in such a manner that the window plate portion 26 fits in the opening 22 of the tape viewing window from the inside of the top case 1a. The plate 20 is secured to the top case 1a by ultrasonic welding.

It is an advantage that since the plate 20 can be attached to the top wall 7 only by fitting the window plate portion 26 in the opening 22 of the tape viewing window 9, the work of attaching the transparent plate 20 can be made simple.

In order to facilitate the welding, a frame like member 29 is formed around the periphery of the window plate portion 26. Another frame like member (not shown) is formed on the inner face of the top wall 7 of the case body 1 corresponding to the frame like member 29 and thus, both of the frame like members are bonded together. Also projecting members 30 and 31 are formed on the front end portions of the upper surface of the plate portions 25a and 25b at the same height as the height of the frame like member 29. The projecting members 30 and 31 are abutted to corresponding projections (not shown) formed on the inner face of the top wall 7 of the case body so that both projections are bonded together by ultrasonic welding.

The front end portion of the central plate portion 25c is clamped by wall members 28a and 28b (FIG. 3) each projecting vertically from the respective inner faces of the top case 1a and bottom case 1b. Under the condition that the plate 20 is fixed to the top wall 7 of the case body 1, there is defined a gap g between the inner face of the top wall 7 and the supporting plate 25 corresponding to the height of the projecting members 30 and 31. It is appreciated the accuracy of the gap g can be assured by forming the frame like member 29 and the projection 30 away from the periphery of the window plate 26 with a space for absorbing the molten portion of the frame like member 29 and the projection 30.

The braking member 21 comprises a horizontal plate 21a elongated in the lateral or the left and right directions and a pair of leg portions 32 formed integral with the horizontal plate 21a so as to form a gate shape in plan view.

The horizontal plate 21a is positioned in the forward direction from the hubs 3 in the case body 1, and the horizontal plate 21a is inserted in the gap g between the top plate 7 and the plate 20 so as to move reciprocally a predetermined length in the forward and rearward directions. The leg portions 32 of the braking member 21 have their bottom face slidably supported on the inner face of the bottom wall 4 with their outer side faces slidably in contact with the inner faces of the side walls 33 of the case body 1 so that rocking movement of the braking member in the lateral direction can be prevented.

The braking member 21 is made of polyaccetal resin materials in order to assure its mechanical strength, slidability and elasticity.

There are defined two recessed portions 35 away from each other in the lateral direction with a suitable distance on the rear edge portion of the horizontal plate 21a of the braking member 21. A pair of engaging bars 36 are formed so as to project backward in a cantilever manner from the bottom of both recessed portions 35 having a suitable resiliency. Each of the engaging bars 36 projects into the lower portion of the plate 20 through the slit 27 so as to detachably engage with the corresponding engaging teeth 23 of the hub 3 when the braking member 21 is assembled in position and moved toward the hubs 3. As mentioned above, the purpose of the slits 27 is to facilitate the project ion of the engaging bars 36 below the plate 20, therefore, the slits 27 may be replaced by holes.

Since each of the engaging bars 36 projects through the recessed portion, the length of the engaging bars 36 can be made longer than in the case when the engaging bars 36 are projected directly from the rear edge of the horizontal plate 21a without the recessed portion, so that the engaging bars 36 have a suitable resiliency in the lateral direction i.e., left and right directions. This arrangement assures the engagement of the free end of each engaging bar 36 with the engaging teeth 23 of the hub 3 from the front and at a position slightly displaced outward from the center of the hub 3, as shown in FIG. 2, even if the hubs 3 are displaced from the center of the drive shaft insertion holes 5 with a maximum limit in the radial direction. A pair of pins P project downward from the inner face of the top wall 7 of the top case 1a near the engaging bars 36 from a centrally displaced position. By this arrangement, when the hubs 3 are subjected to a force to rotate the hub 3 in the direction of releasing the recording tape 2, the deformable engaging bars 36 are supported by the pins P, thereby preventing disengagement of the engaging bars 36 from the engaging teeth 23 and also preventing the recording tape from being released.

Figure 5:
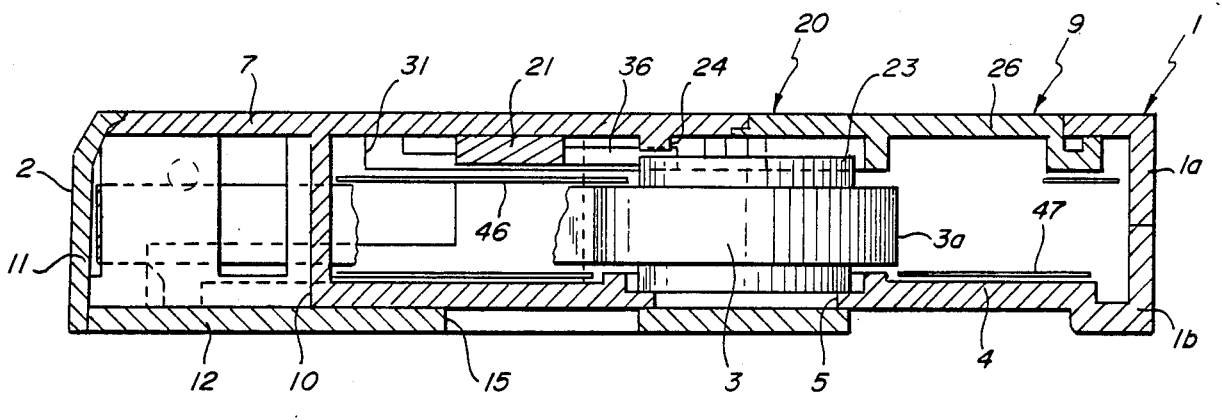
FIG. 5 is a cross sectional view taken along the lines B—B in FIG. 2.

In order to avoid the decrement of the mechanical strength of the braking member 21 around the recessed portions 35, there are formed thick portions 38 on the lower surface of the horizontal plate 21a near the recessed portions 35 and the thick portions 38 engage the slits 27 without interference with the other parts. Thus, as shown in FIG. 5, the engaging bars 36 project in a horizontal direction from the rear end and relatively lower portion of the thick portions 38, passing under the plate 20 and the free end of each of the engaging bars 36 can be engaged by the engaging teeth 23.

Figure 9:
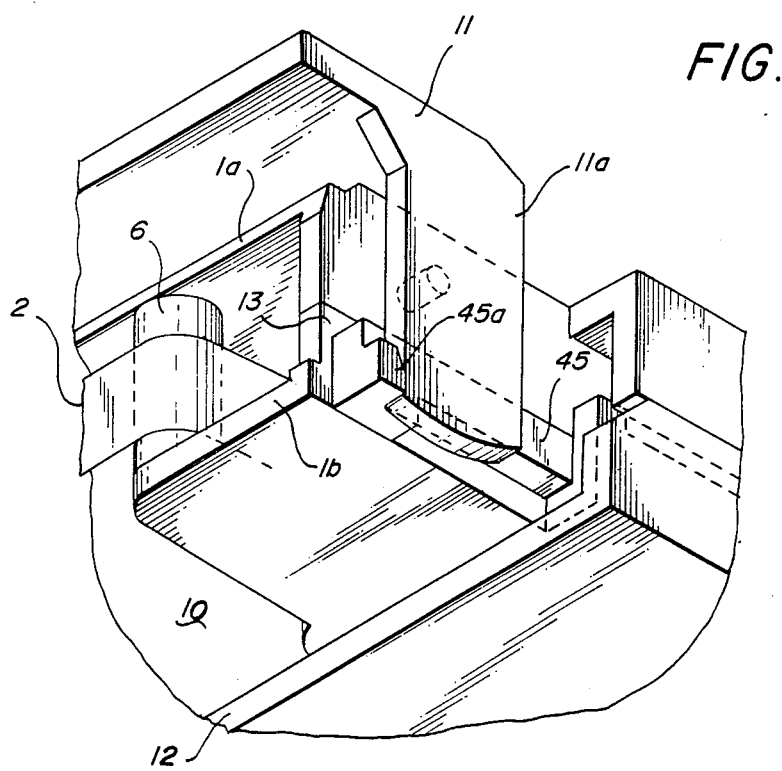
FIG. 9 is a perspective view showing means for displacing the braking member to a released position.
Figure 3:
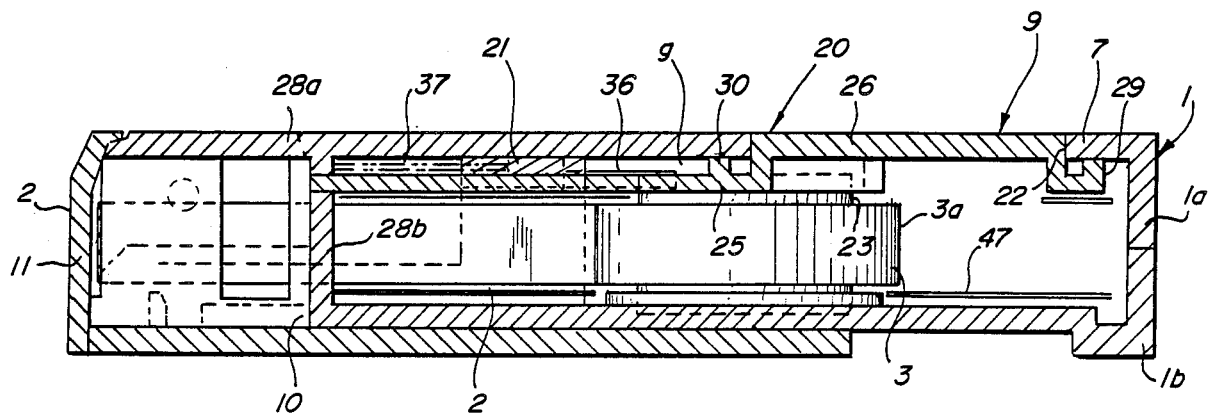
FIG. 3 is a cross sectional view taken along the lines A—A in FIG. 2 when not in use.
Figure 4:
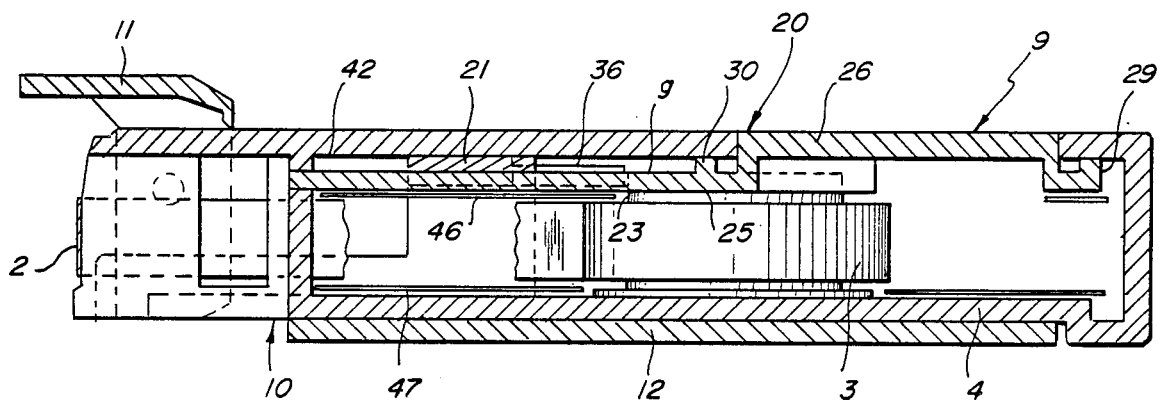
FIG. 4 is a cross sectional view taken along the lines A—A when in use.

The braking member 21 is provided with a spring member for normally biasing the braking member 21 in the rearward direction. Specifically, the spring member 37 is suspended between the top wall 7 and the horizontal plate 21a, as shown in FIGS. 3 & 6. It may be possible to employ various kinds of spring arrangements in place of the spring member 37. In this embodiment, a pin 40 projects from the bottom of a concave 39 area defined on the central portion of the horizontal plate 21a of the braking member 21 and the coiled portion of the spring member 37 is engaged in the pin 40 in such a manner that the upper face of the spring member 37 is flush with or lower than the upper face of the horizontal plate 21a with both free ends of the spring member 37 engaged with the wall member 28a projecting from the inner face of the top wall 7 of the top case 1a. Thus, the pin 40 and the spring member 37 are prevented from interfering with the top wall 7 when the braking member 21 is moved. In order to keep the mechanical strength of the part of the horizontal plate 21a corresponding to the concave area 39, there is formed a reinforcing portion 43 which projects downward at the lower part of the concave area 39 for keeping the thickness of the portion 43 equal to the thickness of the horizontal plate 21a. The reinforcing portion 43 is movably fitted in a slot 44 defined in the front portion of the central plate portion 25c of the support plate 25, as shown in FIGS. 6 and 8. The leg portions 32 of the braking member 21 are provided with guide arms 45 respectively extending horizontally from the bottom ends of the leg portions 32. The guide arms 45 are so arranged in the case body as to slide along the bottom wall 4 and the inner faces of the side walls 33 of the bottom case 1b. As shown in FIG. 7, the free end 45a of each guide arm 45 is adapted to project into the outside of the bottom case 1b from its side wall. The free end of the guide arm 45 is bent downward and outward to form a releasing chip 45a, which is positioned at the lower portion of the connecting arm 11a of the front lid 11 as shown in FIG. 9. A slip sheet 46 is stably located under the plate 20 and the slip sheet 46 contacts the top face of the main portion of the hubs 3 and the top edge of the recording tape 2 wound on the hubs 3. The thick portion 38 of the braking member 21 and the reinforcing portion 43 is adapted not to project below the support plate 25 so as to avoid undesired contact between the slip sheet and the thick portion 38 and reinforcing portion 43. Another slip sheet 47 is placed on the inner face of the bottom wall 4 of the bottom case 1b.

In assembling the tape cartridge as mentioned above, the top case 1a is placed with the inner face directed upward, the braking member 21 is placed on the top case 1a, and in turn the spring member 37 is mounted in position. In turn the plate 20 is placed above the braking member 21, being bonded to the top case 1a by ultrasonic welding. In this way, the braking member 21 and the plate 20 are arranged. The top case 1a to which the components mentioned above are arranged is assembled to the bottom case 1b in which the hubs 3 with the recording tape wound therein and other necessary parts are arranged. The top case 1a and the bottom case 1b are securely connected together by tapping screws.

When the tape cartridge is not in use, the braking member 21 is positioned at a braking position by the force of the spring 37, and the engaging bars 36 are engaged with the engaging teeth 23 of the hubs 3 from the front at positions displaced outward so as to brake the hubs 3.

When the tape cartridge is mounted in the tape player, the front lid 11 is opened and the connecting arms 11a are rotated and engaged with the rear portion of the releasing member 45a of the guide 45 from above so that the braking member 21 is displaced toward the front side of the case body 1 against the force of the spring member 37. The amount of displacement of the braking member 21 is relatively small. The engaging bars 36 are disengaged from the engaging teeth of the hubs 3 to allow rotation of the hubs 3.

Modifications of the plate 20 and other members will be described hereinafter. The support plate 25 of the plate may be formed of stainless steel sheet or other metal sheet for the purpose of reinforcing the plate 20 per se with the window plate 26 formed of a transparent plastic resin sheet and both members 25 and 26 made integral by insert molding. The window plate 26 may be divided into two or more members in the lateral direction. In the case where the window plate 26 is in the shape so as to fit the window opening 22, it is convenient to place the plate 20 in position when the plate 20 and the braking member 21 are preliminarily assembled to the top wall of the top case 1a and work of securing the necessary parts may become easy. However, it may be sufficient to place the window plate 26 so as to close the window opening 22.

The plate 20 may be secured to the inner face of the top wall 7 by merely bonding by adhesive materials in place of using welding. It may be possible to form welding projections on the top case 7.

The gap g may be formed by recessing the inner face of the top wall 7 of the top case 1a relative to the surface of the inner peripheral edge of the winding opening 22 corresponding to the region of the sliding movement of the braking member 21.

The braking member 21 may be inserted in the gap g in such a manner that the plate 20 is first secured to the top wall 7, then the braking member 21 is inserted into the gap g from the front.

The braking member 21 may be slidably placed behind the hubs 3 so as to be moved in the forward and backward direction. In this case, the plate 20 may have such a configuration that the plate 20 has the transparent window plate 26 in the front side of the support plate 25.

In place of forming the engaging bars 36 integral with the braking member 21, the engaging bars 36 may be mounted on the inner face of the top wall 7 or fixed plate 20 with the engaging member 36 biased to contact a part of the hubs 3, whereby the engaging bars 36 are disengaged from the hubs 3 when the braking member 21 is moved to the released position, so that the hubs are released from the braked state. In other words, it is not necessary to integrally form the engaging bars 36 and the braking member 21.

The braking member 21 is not necessarily provided with the legs 32. The braking member 21 may be supported by the top face of the support plate 25 of the plate 20.

The following are modifications of the device of displacing the braking member to the release condition.

Figure 10:
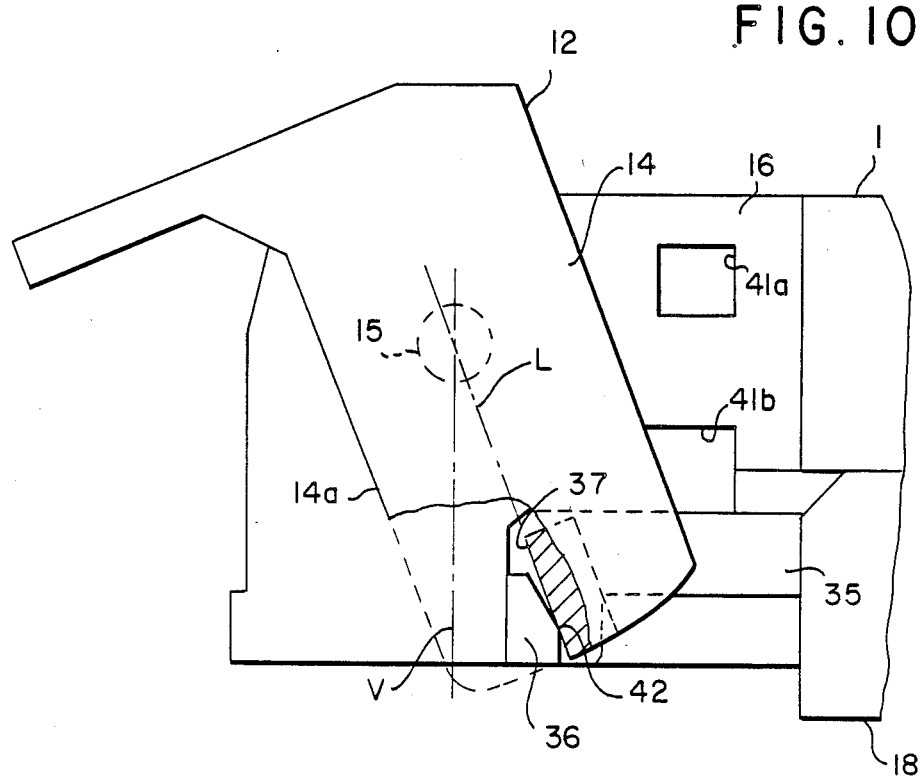
FIG. 10 is a side view showing a modification of a means for displacing the braking member to a release position before releasing of the brake.
Figure 11:
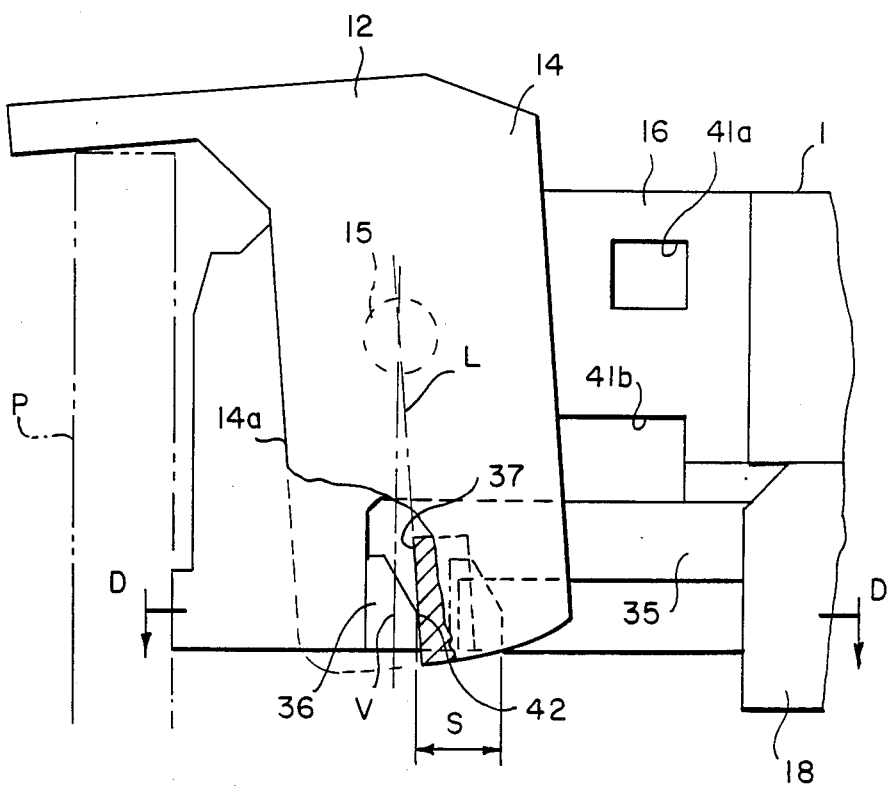
FIG. 11 is a side view showing a means for displacing the braking member after release of the brake.

Referring to FIGS. 10 to 12, when the braking member 21 is placed in the locking position, a contact surface 37 is formed on the inner face of each connecting arm 11a of the front lid 11 so as to contact the receiving surface 45 of the releasing member 45a. The receiving surface 42 is formed behind a vertical line V passing the center of the support shaft 16 of the connecting arm 11a. By this arrangement, the contact surface 37 contacts the receiving surface 42 at the rotating position of the connecting position (the position that the connecting arm 11a is rotated 68 degrees from the closed position for example) when the drive shafts of the tape player sufficiently engage with the hubs 3, whereby releasing of the braking of the hubs is realized. In this arrangement, a phantom line L connecting the contact face 37 and the center of the shaft 15 is made horizontal when the front lid 11 is in the closed position. In other words, when the front lid 11 is in the opened position rotated by 90 degrees from the closed position, the line L coincides with the vertical line V. By this arrangement, since the releasing member 45a can be positioned to the rear away from the vertical line V by a desired distance, it becomes possible to set a releasing stroke S sufficiently large. The releasing stroke S means the distance between a first position where the lock releasing is set and a second position where the front lid 11 is completely opened (where the front lid is rotated by 85° from the closed position). The member P of the tape player is so arranged that the member P contacts the foot portion of the connecting shaft 11a of the front lid 11 from below. In this case, under such a state that the member P pushes the front lid 11 up to open the lid, an outer portion of a projection 36 is fully covered with the connecting arm 11a and yet the projection 36 is sufficiently apart from the side wall 17 of the case body, therefore, interference between the member P and the projection never occurs.

Referring to FIG. 13, there is formed the contact surface 37 by recessing the portion of the inner face of the connecting arm 14 opposing the side wall 17 of the case body 1. The remaining parts are similar to those shown in the embodiment shown in FIG. 11. There is no need to couple the device of displacing the brake releasing member by the operation of the opening of the front lid 11, the device for displacing the brake releasing member can be selected as desired.

It is one advantage of the present invention that the braking member can be easily mounted to the top case body since the braking member is inserted in the gap g defined between the plate and the top wall.

It is another advantage of the present invention that the tape is not interfered with by the braking member since the braking member is inserted in the gap between the plate and top wall of the case body, whereby it is assured that the tape will run stably and be wound on the hub without injuring the tape.

It is a further advantage of the present invention that the braking member can be moved smooth by so that braking of the hub and its releasing can be assured.

What is claimed is:

1. A tape cartridge comprising a case body having a top wall with an opening therein, at least one hub accommodated in the case body for winding a tape, a plate member having a support plate member and a transparent window plate portion attached to said opening from inside of the case body defining a gap g between the support plate member and an inner face of said top wall, and a braking member 21 engageable with said at least one hub to stop rotation of said at least one hub when said tape cartridge is not in use, said braking member being slidably inserted in said gap g.

2. The tape cartridge according to claim 1, wherein said braking member comprises a horizontal plate and at least one engaging member for engagement with said at least one hub to stop rotation thereof and said at least one engaging member projects from a bottom of a recess defined on the side of said horizontal plate opposing said at least one hub.

3. The tape cartridge according to claims 2, wherein said braking member is provided with at least one thick portion formed at a portion where said at least one engaging member is formed.

4. The tape cartridge according to claim 2, wherein a concave area is formed in said horizontal plate of said braking member, a pin is provided which projects from a bottom of said concave area and a spring member is provided supported by said pin.

5. The tape cartridge according to claim 3, wherein said thick portion is slidably fitted in a slit defined in said support plate member of said plate member in the direction of the movement of said braking member.

6. The tape cartridge according to claim 5, wherein the thickness of said thick portion is set in the range of the thickness of said support plate member.

* * * * *